Oct. 20, 1925.
W. J. ERICKSON
1,557,997
HUMIDITY PAN
Filed Oct. 28, 1922
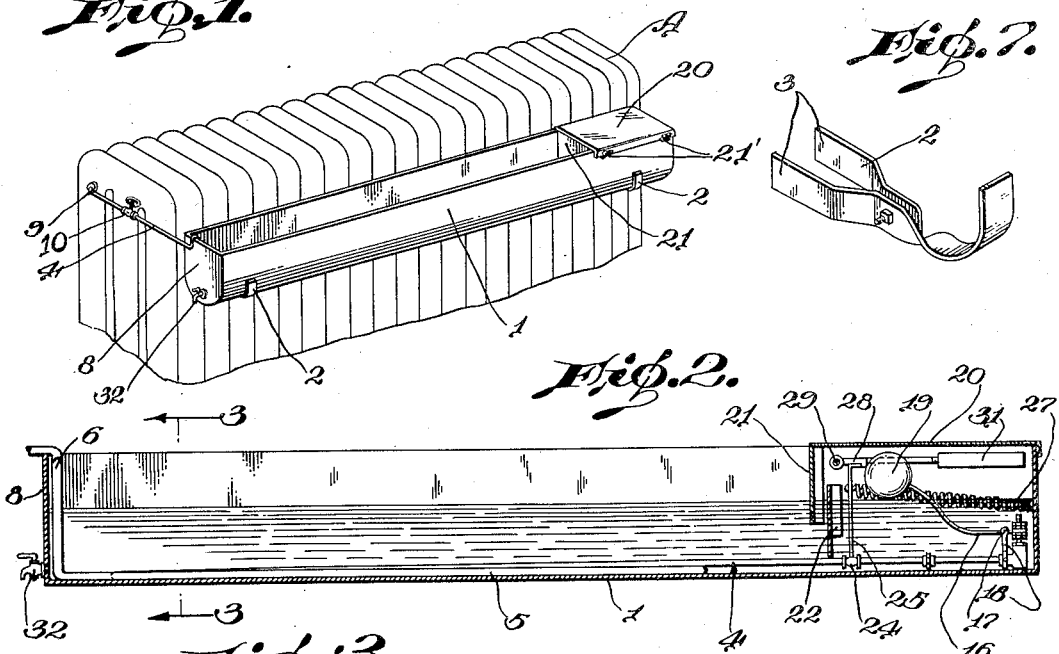
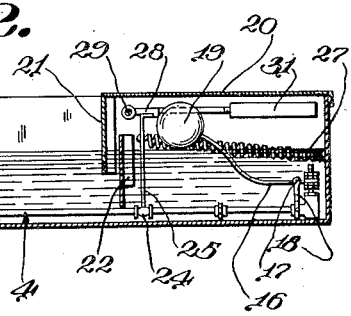
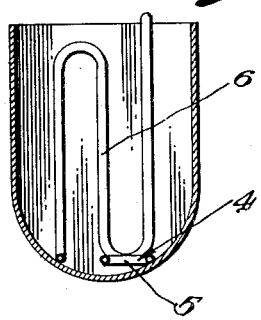
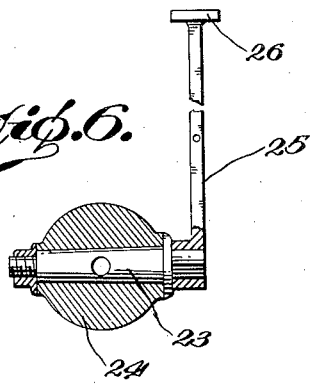
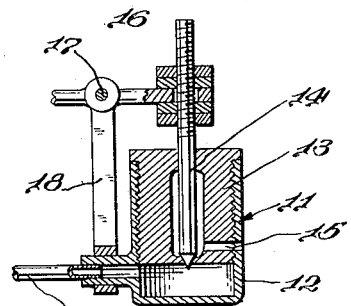
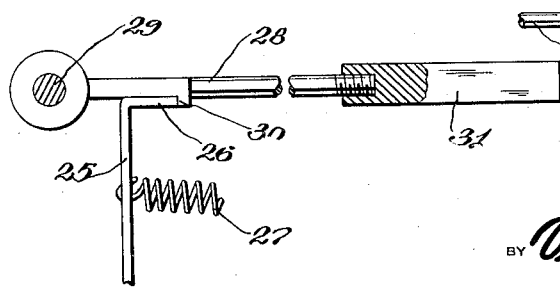
W. J. Erickson
INVENTOR
BY Victor J. Evans
ATTORNEY Patented Oct. 20, 1925.

1,557,997

UNITED STATES PATENT OFFICE.

WARREN JOHN ERICKSON, OF CHICAGO, ILLINOIS.

HUMIDITY PAN.

Application filed October 28, 1922. Serial No. 597,629.

*To all whom it may concern:*

Be it known that I, WARREN JOHN ERICKSON, a citizen of the United States, residing at Chicago, in the county of Cook and State of Illinois, have invented new and useful Improvements in Humidity Pans, of which the following is a specification.

This invention relates to a humidity pan designed for use in connection with steam, hot water, or analogous heating systems and an object of the invention is to provide a pan which will receive its supply of water from the radiator to which it is attached, for preventing excessive dryness of the air of the room in which it is positioned, such dryness of the air being occasioned by the type of heat.

Another object of the invention is to provide a humidity pan as specified which will not only act to prevent excessive dryness of the air in the room but will also bleed or draw air from the radiator thereby resulting in more efficient heating action of the radiator.

A further object of the invention is to provide a humidity pan as specified in which the supply of water from the radiator into the pan is automatically controlled by means of a float valve structure and also to provide a safety valve automatically operated for preventing the overflow of the pan.

Other objects of the invention will appear in the following detailed description taken in connection with the accompanying drawing wherein:

Fig. 1 is a perspective view of the pan showing it applied.

Fig. 2 is a longitudinal section through the pan.

Fig. 3 is a vertical section through the pan taken on the line 3—3 of Fig. 2.

Fig. 4 is a detailed sectional view through the float operated inlet valve.

Fig. 5 is a detailed view partly in section of the safety valve.

Fig. 6 is a detailed section through the safety valve.

Fig. 7 is a perspective view of the supporting bracket used in connection with the pan.

Referring more particularly to the drawing the humidity pan structure includes the trough or pan 1 which is supported alongside of a radiator A by means of the supporting brackets 2. The supporting brackets 2 may be constructed of any suitable type of sheet metal and comprise attaching arms 3 which may be attached to the radiator A in any suitable manner. The outer ends of the supporting brackets 2 are curved to properly engage the bottom of the pan or trough 1.

The pan 1 has a supply pipe 4 mounted therein and extending along the bottom of the pan. The pipe 4 is coiled to provide a condensing coil 5 at the bottom of the pan and it is sinuously bent at one end of the pan to provide an air trap as shown at 6 to prevent air from returning into the radiator A after it has passed therethrough into the pipe 4. The pipe 4 is extended over the end 8 of the trough or pan 1 and is connected as shown at 9 to the outlet end of the radiator A adjacent the top of the end coil so as to permit water and air to pass over the top of the end-most outlet coil of the radiator through the pipe 4 and into the pan. A manually operated valve 10 may be mounted in a portion of the pipe 4 outwardly of the pan if desired.

A valve structure 11 is connected to the outlet end of the pipe 4 and it comprises a casing 12 in which is vertically mounted a plug 13. The plug 13 slidably carries a needle valve 14, which controls passage of water and air from the casing 12 through the passageway 15 into the pan or trough 1. The needle valve 14 is adjustably carried by a lever 16 pivotally supported as shown at 17 by suitable supporting arms 18. A float 19 is mounted on the end of the lever 16 for controlling the seating and unseating of the needle valve 14 by the rise and fall of the water in the pan. Thus it will be seen that as the water in the pan evaporates the float 19 will move downwardly and gradually unseat the needle valve 14 permitting an additional supply of water and air to enter the pan from the radiator and then as the supply of water reaches a predetermined height in the pan the needle valve 14 will be seated cutting off the flow of water and air.

The float 19 and valve structure 11 are positioned at the end of the pan 1 remote from the trap 6 and they are enclosed by means of a removable cover 20 which is detachably connected preferably by means of wing nuts 21' to the trough 1. One end of the cover 20 has depending baffle plate 21 formed thereon which extends downwardly into the trough and cooperates with the baffle 22 which extends upwardly from the bottom of the trough. Baffles 21 and 22 overlap but are spaced as clearly shown in Fig. 2 of the drawing so as to permit the water to pass from the enclosed end of the pan out into the open portion thereof for evaporation. Baffles 21 and 22 are provided to prevent steam from entering the open portion of the pan and also to prevent any air which might be bled from the radiator, from bubbling up through the exposed water in the pan.

A safety valve structure is provided for cutting off the flow of water into the pan in case the needle valve 14 fails to properly seat.

The safety valve structure comprises a valve cone 23 rotatably mounted in a suitable valve casing 24 which is interposed in the pipe 4 between the condensing coil 5 and valve structure 11. A valve stem 25 is connected to the valve cone 23 for rocking it and it extends upwardly within the enclosed end of the trough and has its upper end angled as shown at 26. A spring 27 is connected to the valve stem 25 and urges it always into valve closing position, however, the spring 27 is tensioned and the valve stem 25 is held in valve opening position by means of a lever 28 pivotally supported as shown at 29. The lever 28 has a shoulder 30 thereon against which the angled end 26 of the valve stem 25 engages when the water in the pan 1 reaches a dangerous level or is about to overflow which will act upon the float 31 carried by the lever 28 and will raise the lever 28 sufficiently to permit disengagement of the angled end 26 and shoulder 30 which will permit the spring 27 to act for closing the safety valve structure.

A drain pet cock 32 may be provided at the end of the trough or pan 1 remote from its closed end to permit draining of the pan when desired.

From the foregoing description taken in connection with the accompanying drawings it will be apparent that a humidity pan has been provided in which the supply of water thereto will be entirely automatically controlled, providing a pan which will require no attention and one in which there will always be sufficient supply of water. It will further be noted that the system of supplying water to the pan will drain air from the radiator permitting its more efficient heating action.

It is, of course, to be understood that the invention may be constructed in various other manners and the parts associated in different relations, and, therefore, I do not desire to be limited in any manner except as set forth in the claims hereunto appended.

Having thus described my invention what I claim is:

1. The combination with a heating radiator, of a humidity pan, a supply pipe in said pan having connection with the outlet end of the radiator to permit water and air to flow from the radiator into the pan, a trap formed in said pipe to prevent the return of air into the radiator, a float valve structure for controlling the flow of water and air from the pipe into the pan, and an automatically operated safety valve structure for further controlling the flow of air and water from the pipe into the pan.

2. The combination with a heating radiator, of a humidity pan, a supply pipe in said pan having connection with the outlet end of the radiator to permit water and air to flow from the radiator into the pan, a float valve structure for controlling the flow of water and air from the pipe into the pan, and an automatically operated safety valve structure for further controlling the flow of air and water from the pipe into the pan.

In testimony whereof I affix my signature.

WARREN JOHN ERICKSON.